March 23, 1965    J. A. KAISER, JR., ETAL    3,175,217
DIRECTION FINDER
Filed Jan. 28, 1963    2 Sheets-Sheet 1

INVENTORS,
JULIUS A. KAISER, JR.
HOWARD B. SMITH, JR.
JOHN H. LITTLE
WILLIAM H. PEPPER

United States Patent Office 3,175,217
Patented Mar. 23, 1965

3,175,217
DIRECTION FINDER
Julius A. Kaiser, Jr., Kensington, Md., Howard B. Smith, Jr., Bremerton, Wash., John H. Little, Oxnard, Calif., and William H. Pepper, Bethesda, Md., assignors to the United States of America as represented by the Secretary of the Army
Filed Jan. 28, 1963, Ser. No. 254,523
5 Claims. (Cl. 343—113)
(Granted under Title 35, U.S. Code (1952), sec. 266)

The invention described herein may be manufactured and used by or for the Government of the United States of America for governmental purposes without the payment to us of any royalty thereon.

This invention relates to the field of radiation source direction finders and more particularly to direction finders utilizing an Archimedean spiral antenna.

The direction finder of the present invention makes use of the directional characteristics of the two-wire spiral antenna. This characteristic will first be described with respect to the directional nature of the beam produced by such an antenna when it is used as a signal transmitting element. Reciprocity theorems will then be relied upon in order to demonstrate how these transmission characteristics may be applied to a directionally sensitive receiving system.

It is therefore an object of this invention to detect the direction of a source of electromagnetic signals.

It is another object of this invention to obtain directional information having no ambiguity over one hemisphere.

It is yet another object of this invention to obtain directional information utilizing a passive system having no moving parts.

A further object of this invention is to obtain directional information through the utilization of the directional sensitivity characteristics of the two-wire spiral antenna.

The two-wire spiral antenna, a relatively new antenna configuration, has many unusual properties. Among these properties is the ability of the antenna to produce a pencil beam in any given direction. The procedure used for producing such a beam is fully described in U.S. patent application Serial No. 163,369, filed on December 29, 1961, now U.S. Patent No. 3,135,960, by one of the present applicants and assigned to the assignee of the present invention. That patent shows a spiral antenna identical with the one to be used in the practice of the present invention and teaches that a spiral antenna can be made to radiate in its first two radiation modes simultaneously. The first radiation mode is produced when the signals introduced at the inputs to the two antenna wires are anti-phase. These signals travel along the wires until reaching a point where they are in phase with each other, causing radiation to occur. The geometry of such spiral antennas causes radiation to occur at their one-wavelength circumferences. Similarly, when the inputs to the two filaments are in phase with each other the currents will be anti-phase at the one-wavelength circumference, thus suppressing radiation, and will be in phase at the two-wavelength circumference, producing radiation. A more detailed description of this operation will be found in said patent.

These and other features of the invention will become more readily apparent from the following discussion taken in connection with the drawings in which.

Figure 1:
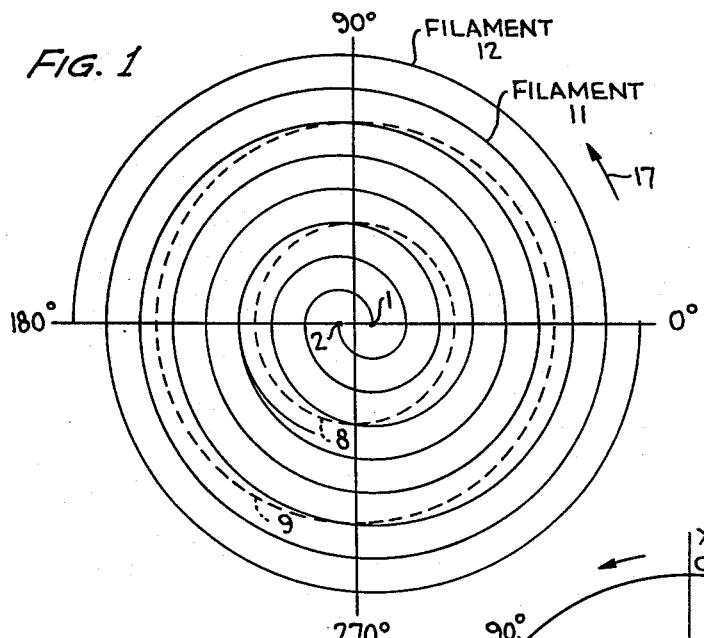
FIG. 1 is a pictorial representation of a spiral antenna used in the practice of this invention.

Turning now to FIG. 1 there is shown a two-wire spiral antenna having input terminals 1 and 2 and wire filaments 11 and 12 connected to input terminals 1 and 2, respectively. When anti-phase signals are introduced into the input terminals they travel outward along the wire filament until reaching the one-wavelength circumference, indicated by the dotted circle 8. At this circumference they are effectively in phase so that electromagnetic radiation is produced. It is important to note that when the input signals are referred to as being "anti-phase" this means only that one input signal is 180° out of phase from the other input signal and bears no relation to the phase of one of these signals with respect to some reference, such as ground. Similarly, when the two input signals are identified as being "in phase" they are only being described as having a zero phase difference between them; this does not preclude the possibility that they might be at some arbitrary phase with respect to a reference signal. Thus, if a pair of in phase signals were to be inserted at the input terminals 1 and 2 of the antenna of FIG. 1 simultaneously with a pair of anti-phase signals, one pair of signals could have any arbitrary phasing with respect to the other.

If the input terminals 1 and 2 were excited with in phase signals, these signals will proceed outward along the wire filaments in the direction of the arrow 17. Upon reaching the one-wavelength circumference, signals in adjacent filaments would have become anti-phase, so that no radiation would occur. The current would then proceed along the spiral until reaching the two-wavelength circumference 9 where they would be in phase, causing radiation to occur.

Since anti-phase input signals produce radiation at the one-wavelength circumference of the spiral antenna, this pair of signals will go through a 360° time phase rotation in traveling around that circumference. This means that if the signals in adjacent wire filaments at the one-wavelength circumference have an arbitrarily chosen 0° time phase at the zero axis of FIG. 1, these signals will shift in time phase by 90° by the time they reach the 90° axis of FIG. 1, by 180° at the 180° axis and by 270° at the 270° axis. On the other hand, when the antenna is excited with in phase input signals, causing radiation to occur at the two-wavelength circumference, such signals will experience 720° time phase shift in traveling around this circumference. This means that if the time phase of the second mode radiation is arbitrarily selected to be zero degrees along the zero degree axis of FIG. 1, the signal will experience a time phase shift of 180° at the 90° axis, 360° at the 180° axis and 540° at the 270° axis. The time phase of this signal at the 180° axis can also be considered to be at 0 degrees, since it will be in time phase with the signal appearing at the zero degree axis, while the second mode signal at the 270° axis can be considered to be at a 180° time phase, since it is in phase with the second mode signal appearing at the 90° axis.

Figure 2:
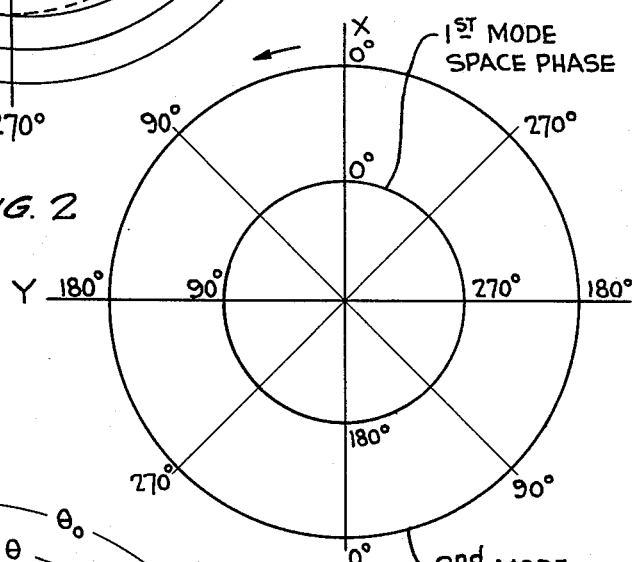
FIG. 2 is a phase diagram of the signals produced by the antenna of FIG. 1.

If the spiral antenna where simultaneously excited by both in phase input signals and anti-phase input signals, both raidation modes would be produced. The time phase of the two radiation modes are indicated in the phase diagram of FIG. 2 wherein the smaller circle represents the time phase of the signal produced at the one-wavelength circumference and the outer circle represents the time phase of the signal produced at the two-wavelength circumference. The time phase diagram of FIG. 2 is considered to lie in the plane of the antenna and to have its axis coincident with the antenna axis. When the relative phase of the in phase input signal is properly chosen with respect to the anti-phase input signal, the radiation produced by the two modes will be in time phase in the direction of the $x$ axis. The signal produced will exhibit "beam cock," a phenomenon which results in a pencil beam pointing in that direction in which the two radiation modes are in time phase. This pencil beam will also be at an angle with respect to the plane of the spiral which is dependent upon the relative amplitudes of the two pairs of input signals. This is so because the radiation produced at the one-wavelength circumference is a maximum along the antenna axis while the two-wavelength circumference radiation pattern is a maximum in the plane of the antenna.

The direction of the pencil beams with respect to the coordinate axes of FIG. 2 can be varied by varying the relative phase of one of the pairs of input signals. If the two input signal pairs have the relative phase indicated in FIG. 2, they will produce a pencil beam in the direction of the positive $x$ axis. The time phase of the second mode radiation signal at any point around the two-wavelength circumference of the spiral antenna, with respect to the reference time phase, is equal to $2\alpha$, where $\alpha$ is the angle between $x$ axis and the axial line passing through the point of interest. Similarly, the time phase of the first mode radiation signal at some point around the one-wavelength circumference will be equal to $\alpha$. If the time phase of one of the input signals were to be varied with respect to the reference time phase, the zero angular time phase of its resultant radiation signal would be rotated by some angle $\phi$. For example, if the in phase input signal were made to lead the reference phase signal by some fixed electrical phase $\phi_2$, the second mode circle of FIG. 2 would rotate in a counterclockwise direction. The angular space rotation of the zero time phase reference point on the second mode circle will be represented by $\alpha_2$ and is equal to $\phi_2/2$. In the succeeding discussion the symbol "$\phi$" will be used to designate electrical phase angles and symbol "$\alpha$" will be used to designate space angles taken with respect to the $x$ axis. When the phase of the in phase input signal is thus shifted, the time phase of the second mode radiation pattern at any angle $\alpha$ with respect to the phase at the $x$ axis of the coordinates of FIG. 2 will be equal to $2\alpha - \phi_2$, while the time phase of the unrotated first mode radiation signal at any point around the one-wavelength circumference, with respect to the $x$ axis phase, will be equal to $\alpha$. Since the pencil beam produced by the simultaneous excitation of the first two radiation modes will point in the direction in which the two signals are in phase, this direction may be determined by equating the phase expression for the second mode radiation pattern with that for the first mode radiation pattern. This yields the equality:

$$2\alpha - \phi_2 = \alpha \qquad (1)$$

The two signals must be in phase in a direction where $\alpha = \phi_2$. It is also possible to maintain the phase of the in phase input signal constant and to shift the phase of the anti-phase input signal in order to obtain rotation of the resultant pencil beam. The general case for phase rotation would be the one where both signals are rotated, the first mode signal being rotated by an amount equal to $\phi_1$, and the second mode signal being rotated by an amount $\phi_2$. The direction in which the signals are in phase could then be determined by equating the angular phase expression for the first mode radiation pattern, $$\phi = \alpha - \phi_1 \qquad (2)$$

and the expression for the phase of the second mode radiation pattern, $$\phi = 2\alpha - \phi_2 \qquad (3)$$

Solving such an equation in terms of $\phi$ yields the result that the signals are in phase, or the $\phi$ of Equation 2 equals the $\phi$ of Equation 3 when $$\alpha - \phi_1 = 2\alpha - \phi_2 \qquad (4)$$

or $$\alpha = \phi_2 - \phi_1 \qquad (5)$$

The above expression for the value of $\alpha$ at which the signals are in space phase clearly establishes that the direction in which the resultant pencil beam radiates is determined by the phase difference between the two input signals rather than by the phases of the signals with respect to any arbitrary reference phase.

Figure 3:
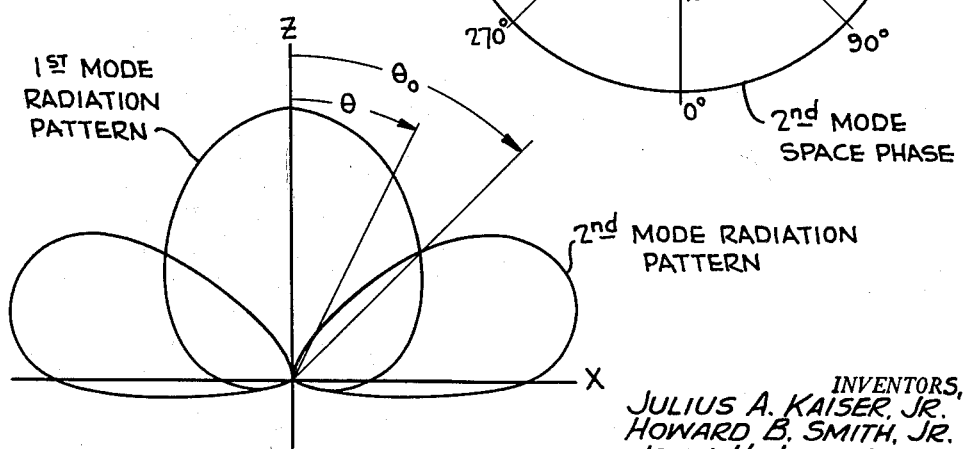
FIG. 3 is a radiation pattern diagram of the signals produced by the antenna of FIG. 1.

In addition to pointing in a particular direction with respect to the two coordinate axes of FIG. 2, the pencil beam produced by the simultaneous excitation of the first two radiation modes points in a direction which is at some angle with respect to the plane of the spiral antenna. This component of the beam's direction is due to the fact that the first mode radiation pattern is one which has its maximum radiation in the direction of the spiral antenna axis while the radiation pattern of the second mode has a null in the direction of the antenna axis and a maximum in the plane of the spiral antenna. Exact field equations for these radiation patterns are not presently available but it has been found that, as a first approximation, the first radiation mode can be represented by (neglecting time variation) $B \cos\theta (e^{j(\alpha - \phi_1)})$ and the second radiation mode $A \sin\theta e^{j(2\alpha - \phi_2)}$ where $\alpha$ is measured in the range 0 to $2\pi$ with respect to the positive $x$ axis of FIG. 2 and $\theta$ is measured between 0 and $\pi/2$ with respect to the positive Z axis of FIG. 3. Since the resultant beam produced by the simultaneous excitation of the first two radiation modes occurs in the direction $\alpha$ where $\alpha - \phi_1$ equals $2\alpha - \phi_2$, the variation in the amplitude T in the resultant pencil beam for various values of $\theta$ will be proporational to $$A \sin\theta + B \cos\theta \qquad (6)$$

where T is the resultant signal around a unit circle which has its center at the center of the antenna and which lies in a plane which includes the radial line which is at the angle $\alpha$ with respect to the $x$ axis of FIG. 2 and which also includes the antenna axis. The angle $\theta$ at which this signal is a maximum can be determined by a simple differentiation of Equation 6. This differentiation yields the result:

$$(A \cos\theta - B \sin\theta) = \frac{dT}{d\theta} \qquad (7)$$

Since the signal will be a maximum when T is a maximum or when $$\frac{dT}{d\theta} = 0$$

maximum radiation will occur in the direction where $$A \cos\theta - B \sin\theta = 0 \qquad (8)$$

or when $$\theta = \arctan\frac{A}{B} \qquad (9)$$

This simple expression provides a rough approximation for the relation between the angle $\theta$ and the amplitudes of the two input signals. However, this relation is monotonic in nature and it is possible to obtain experimental data defining this relation and to construct a function generator to transfer from the desired angle $\theta$ to the required input signal amplitudes for that angle.

Thus it may be seen that the amplitudes and phases of the first two radiation mode input signals to a spiral antenna completely define the direction in three dimensions of the resultant pencil beam. The present invention utilizes this property of the spiral antenna in accordance with the Rayleigh-Carson Reciprocity Theorem in a system which produces a non-ambiguous indication of the direction from which a target signal is being received. The antenna is provided with a ground plane on one side thereof so that the system is responsive to signals received from the hemisphere on the other side of the antenna.

According to the above-mentioned reciprocity theorem, if an electromotive force E inserted in antenna 1 (in this case the receiving antenna of the invention) causes a current I to flow at a certain point in a second antenna 2 (a target antenna positioned in the direction of the pencil beam produced by antenna 1), then the same voltage E applied at this point in the second antenna will produce the same current I (both in magnitude and phase) in a short circuit at the point in antenna 1 where the voltage E was originally applied. This means that if the antenna used with the present invention has a specific pair of input signals applied that produce a pencil beam at a certain angle $\theta$ with respect to the antenna axis and at an angle $\alpha$ with respect to some arbitrary axis in the plane of the antenna, then a signal originating from a point at this same pair of angles $\theta$ and $\phi$ will produce a resultant signal at the input terminals 1 and 2 of the receiving antenna which will have an in phase component and an anti-phase component, the relative amplitudes and phases of which will be equal to those of the hypothetical transmitted pencil beam inputs and which will uniquely define the direction from which the received signal came. It is then only necessary to perform an amplitude comparison and a phase comparison on the two components thus obtained in order to completely determine the direction from which the received signal emanated.

Figure 4:
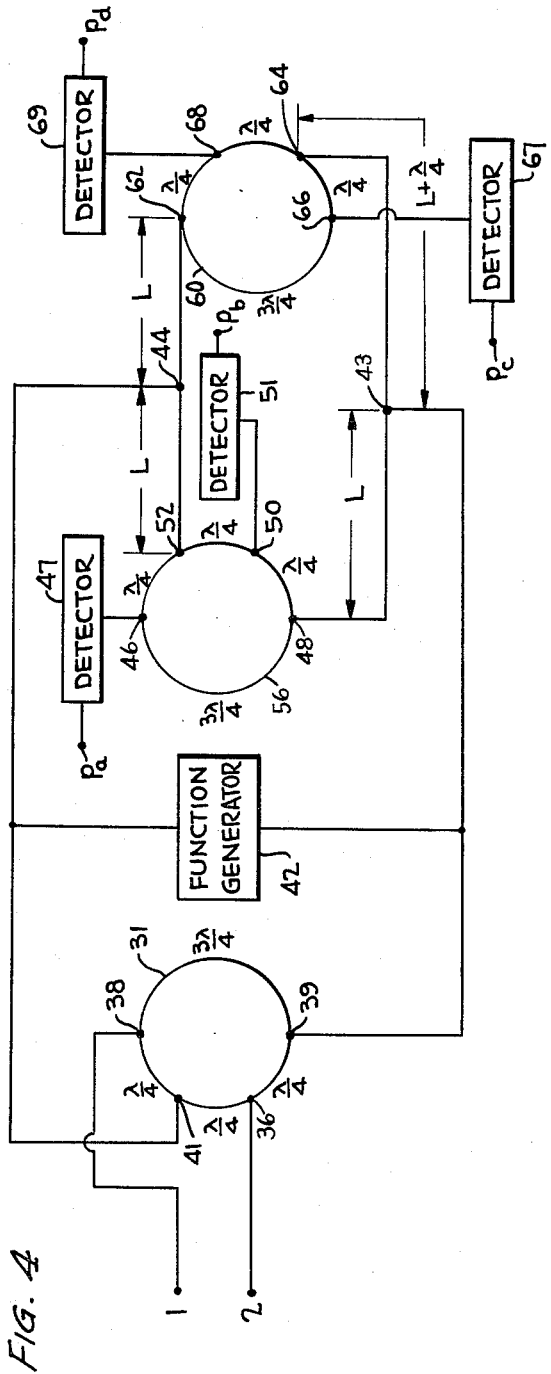
FIG. 4 is a schematic diagram of the preferred embodiment of this invention.

FIG. 4 illustrates a system designed to obtain the requisite information. The terminals 1 and 2 are the input terminals from the spiral antenna of FIG. 1. These terminals are connected to the input terminals 38 and 36 respectively of a 1½ wave length ring network 31. The portion of these two input signals which are in phase with each other are conducted to terminal 41 of the ring network and the component of the two inputs which are anti-phase are fed to the terminal 39 thereof. Thus, the amplitude of the signal appearing at terminal 39 represents the first mode signal received by the antenna and the signal appearing at the terminal 41 represents the second mode signal. The ring network 31 is well-known in the art and is fully described in the said Patent No. 3,135,960. The output from terminals 39 and 41 are sent to a function generator 42 which is designed to produce an output indication of the angle $\theta$ from which the signal is emanating in response to the relative amplitude of its two inputs. As has been noted previously the relation between the angle $\theta$ and the relative amplitude of the two radiation mode signals is not a simple one and is determined by the characteristics of the particular antenna being used. Therefore, it is necessary to design the function generator to correspond to the particular antenna used. The signals produced at the output of ring network 31 are also conducted to the terminals 43 and 44 of a phase comparator. This comparator consists of two networks which are identical with the ring network 31. The comparator also consists of four square-law detectors 47, 51, 67, and 69. The signals leaving the ring network 31 at terminals 39 and 41 have identical frequencies and a phase difference between them which is determined by the angle $\alpha$ existing between some zero reference direction and the direction in the plane of the spiral antenna from which the signals are emanating. Since the length of the line between terminals 41 and 44 is equal to the length of the line between terminals 39 and 43 the signals appearing at terminals 43 and 44 will have the same phase relation as the signals appearing at terminals 39 and 41, respectively. These signals are conducted to terminals 48 and 52, respectively, of ring network 56 along equal length line segments L. These signals travel to terminal 50 where their in phase components are summed and detected in square law detector 51. This type of detection serves to eliminate the time variation which characterize the signal appearing at terminal 50. Since terminal 50 is equidistant from terminals 48 and 52, it will receive the components of the two input signals to this ring network which are in phase with each other. Since these signals are separated by a phase difference, which will be identified as $\delta$, the signal appearing at terminal 52 of ring network 56 may be considered to be the zero, or reference phase and the signal appearing at terminal 48 thereof can be considered to be at an angle $\delta$ with respect thereto. Therefore, the total signal appearing at terminal 50 of ring network 56 will be equal to $B+A \cos \delta$ while the signal appearing at terminal 46 will be equal to $B-A \cos \delta$. The output of detector 47 will appear at the terminal $P_a$ and will be in the form:

$$B^2 + A^2 \cos^2 \delta - 2AB \cos \delta \tag{10}$$

The output of detector 51, which is identified as $P_b$ will be represented by:

$$B^2 + A^2 \cos^2 \delta + 2AB \cos \delta \tag{11}$$

The signal appearing at terminal 62 of ring network 60 will have the same phase as the signal appearing at the terminal 52 at the ring network 56, since both signals travel the same distance L from the terminal 44 to their respective ring network input terminals. However, the length of the line between the terminals 43 and 64 is one-quarter of a wavelength greater than the length of the line from terminal 43 to terminal 48. Therefore, the signal appearing at terminal 64 of the ring network 60 will be delayed in time phase by 90° with respect to the signal appearing at terminal 48. This means that the component of the signal A which will be added to the signal B at terminals 66 and 68 will be equal to $$A \cos \left( \delta + \frac{\pi}{2} \right)$$

or $A \sin \delta$. When the signals are added at terminals 68 and undergo detection and squaring in detector 69 the output, identified as $P_d$, will be equal to:

$$B^2 + A^2 \sin^2 \delta + 2AB \sin \delta \tag{12}$$

Similarly, the signal appearing at the output of detector 67 and identified as $P_c$ will be equal to $$B^2 + A^2 \sin^2 \delta - 2AB \sin \delta \tag{13}$$

If the signal $P_a$ is subtracted from the signal $P_b$ the results will be a signal equal to $4AB \cos \delta$ and if the signal $P_c$ is subtracted from $P_d$ the result will be a signal equal to $4AB \sin \delta$. This can be accomplished with the use of standard subtraction circuits (not shown). The two resulting signals can then be divided so as to obtain a signal equal to $\tan \delta$ in any well-known division circuit (also not shown). The value thus obtained, taken in conjunction with information as to the polarities of the two difference sigals, $P_b - P_a$ and $P_d - P_c$, will uniquely define the direction $\alpha$ from which the received signal is emanating.

There has thus been described one form of device for measuring the amplitude difference and the phase difference between the pair of signals detected by a spiral antenna. It should be obvious that there are many other forms of circuitry capable of performing these functions. It is therefore to be understood that it is the purpose of this invention to disclose the broad concept of isolating the in phase signal from the anti-phase signal appearing at the antenna input terminals when the spiral antenna is used as a receiving device or, in other words, to isolate the first mode received signal from the second mode received signal, and to then compare the amplitudes and phases of these two signals in order to determine the direction of origin of the received signals.

It will be apparent that the embodiment shown is only exemplary and that various modifications can be made in construction and arrangement within the scope of the invention as defined in the appended claims.

We claim as our invention:

1. A device for determining the direction of origin of an electromagnetic signal comprising:
   (a) Archimedean spiral antenna means comprising two wire filaments and having a circumference which is equal to or greater than two wavelengths of the received signal;
   (b) a signal processing means electrically connected to said filaments for providing an indication of the direction from which said electromagnetic signal is emanating, said signal processing circuit including means for isolating that component of the received signal which is detected by the two-wavelength circumference of said antenna from that component of the received signal which is detected by the one-wavelength circumference of said antenna.

2. A device as recited in claim 1 wherein said signal processing circuit is electrically connected to the innermost ends of said filaments.

3. A device as recited in claim 1 wherein said signal processing circuit additionally includes means connected to said means for isolating for providing indications of the relative amplitudes and phases of said two signal components.

4. A device as recited in claim 2 wherein said signal processing circuit further includes means connected to said means for isolation for providing an indication of the relative phase of said signal components comprising:
   (a) a pair of ring networks each of which comprises a closed loop of conductive material having a circumference equal to one and one-half wavelengths of the signal being detected, a pair of input terminals electrically connected to said loop and having a one-half wavelength section of loop between them, a pair of output terminals electrically connected to said loop and having a one-half wavelength section of loop between them, each of said input terminals having a one-quarter wavelength section of loop between itself and a respective one of said output terminals;
   (b) conducting means connected to one of said input terminals of each of said loops for conducting one of said isolated components of said received signals thereto;
   (c) delay means connected to the other of said input terminals of each of said loops for conducting the other of said isolated components of said received signal thereto in such a manner that the signal appearing at the other input terminal of one of said loops will have a phase difference of 90° with respect to the signal appearing at said other input terminal of the other of said loops; and
   (d) means connected to the output terminal of said ring networks for indicating the ratio of the difference between the power produced at said pair of output terminals of said one loop to the difference between the power produced at said pair of output terminals of said other loop, said ratio being proportional to the phase difference between said two isolated components.

5. A passive microwave phase comparator comprising:
   (a) a source of a pair of signals to be compared;
   (b) a pair of ring networks each of which comprises a closed loop of conductive material having a circumference equal to one and one-half wavelengths of the signals to be compared, a pair of input terminals electrically connected to said loop and having a one-half wavelength section of loop between them, a pair of output terminals electrically connected to said loop and having a one-half wavelength section of loop between them, each of said input terminals having a one-quarter wavelength section of loop between itself and a respective one of said output terminals;
   (c) conducting means electrically connected to said signal source and to one of said input terminals of each of said loops for conducting one of the signals from said source to said terminals;
   (d) delay means electrically connected to said signal source and to the other of said input terminals of each of said loops for conducting the other of the signals from said source and for delaying the signal appearing at the other input terminal of one of said loops by 90° with respect to the signal appearing at the other input terminal of said other loop; and
   (e) means connected to the output terminals of said ring networks for indicating the ratio of the difference between the power at said pair of output terminals of said one loop to the difference between the power produced at said pair of output terminals of said other loop, said ratio being proportional to the phase difference between the pair of signals to be compared.

References Cited by the Examiner

UNITED STATES PATENTS

| | | | |
|---|---|---|---|
| 2,947,000 | 7/60 | Marston et al. | 343—895 |
| 3,013,265 | 12/61 | Wheeler | 343—113 |
| 3,135,960 | 6/64 | Kaiser. | |
| 3,144,648 | 8/64 | Dollinger | 343—100 |

CHESTER L. JUSTUS, *Primary Examiner.*